(12) United States Patent
Belz et al.

(10) Patent No.: US 7,158,175 B2
(45) Date of Patent: Jan. 2, 2007

(54) SYSTEM INCLUDING A DIGITAL CAMERA AND A DOCKING UNIT FOR COUPLING TO THE INTERNET

(75) Inventors: Steven M. Belz, Pittsford, NY (US); Susanne Chambers, Rochester, NY (US); Kenneth A. Parulski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 754 days.

(21) Appl. No.: 10/017,809

(22) Filed: Nov. 30, 2001

(65) Prior Publication Data
US 2003/0090572 A1    May 15, 2003

(51) Int. Cl.
*H04N 5/76* (2006.01)
(52) U.S. Cl. ............................. 348/231.3; 348/211.3; 348/231.2; 348/231.9; 348/373
(58) Field of Classification Search .. 348/231.2–231.9, 348/272, 207.11, 373, 375, 552, 211.3, 211.11, 348/211.99
See application file for complete search history.

(56) References Cited
U.S. PATENT DOCUMENTS

| 5,164,831 | A |  | 11/1992 | Kuchta et al. |
| 5,666,215 | A |  | 9/1997 | Fredlund et al. |
| 5,760,917 | A |  | 6/1998 | Sheridan |
| 5,825,408 | A | * | 10/1998 | Yuyama et al. .......... 348/14.01 |
| 6,167,469 | A | * | 12/2000 | Safai et al. .................... 710/62 |
| 6,288,800 | B1 | * | 9/2001 | Izumi ........................ 358/468 |
| 6,392,697 | B1 | * | 5/2002 | Tanaka et al. ............ 348/220.1 |
| 6,721,001 | B1 | * | 4/2004 | Berstis ..................... 348/231.3 |
| 6,812,962 | B1 | * | 11/2004 | Fredlund et al. ......... 348/231.2 |
| 6,891,567 | B1 | * | 5/2005 | Steinberg ................ 348/211.99 |
| 6,930,709 | B1 | * | 8/2005 | Creamer et al. ......... 348/211.3 |
| 2001/0024232 | A1 | * | 9/2001 | Suzuki ........................ 348/207 |
| 2001/0024236 | A1 | * | 9/2001 | Sato et al. ................... 348/239 |
| 2002/0161476 | A1 | * | 10/2002 | Panofsky et al. ........... 700/231 |

FOREIGN PATENT DOCUMENTS

| JP | 2000-232599 | * | 8/2000 |
| JP | 2000-232599 A | * | 8/2000 |

OTHER PUBLICATIONS

Japan Electronics Industries Development Association, "Design Rule for Camera File System," Dec, 1998, version 1.0.*
*CompactFlash Specification Version 1.4*, published by the CompactFlash Association, Palo Alto, California, Aug. 5, 1998.

* cited by examiner

*Primary Examiner*—Vivek Srivastava
*Assistant Examiner*—Chriss S. Yoder
(74) *Attorney, Agent, or Firm*—Raymond L. Owens

(57) ABSTRACT

Described is a system having a digital camera and a docking unit which permits the docking unit to receive images over a channel and direct them to a viewable display in the digital camera.

14 Claims, 11 Drawing Sheets

FIG. 7A - Service Account Information

```
 1
 2
 3    Customer Name
 4    Password
 5    Customer E-mail address
 6    Customer Shipping address
 7    Billing information
 8
 9    Content
10         Content update: Daily
11         Weather: Rochester NY
12         Stocks: EK, INT, WMT
13         Sports: Milwaukee Brewers, Milwaukee Bucks, Green Bay Packers
14         News: Rochester NY local news, US national political news
15         Jokes: Family humor, Political humor, Sports humor
16
17    Designee #1    Shipping address
18
19    Designee #2    Shipping address
20
21    Product ID -1
22    Product Type: Album
23         Page size: 8 x 10
24         Album type: 3 ring punch - 2" thick (50 pages)
25         Background style: #217 - Marble
26         Page numbers:
27              Style: - 1 -
28              Font: Helevetica
29              Color: Blue
30         Ship to: Designee #1
31
32    Product ID -2
33    Product Type: PictureCD
34         Delivery: After each 100 images
35    Ship to: Designee #1
36
37    Product ID -3
38    Product Type: Service print
39         Print size: 4 x 6
40         Print finish: Glossy
41         Date stamp: Front print, Lower left, white, 12 pt. Helvetica
42         Ship to: Designee #2
43
44    Image upload time
45         1:00 am EST
46
```

FIG. 7B

| | | | |
|---|---|---|---|
| 51 | Image 4: | PIC_0004.JPG | Uploaded 14/01/1999 |
| 52 | ... | | |
| 53 | Image 55: | PIC_0098.JPG | Uploaded 12/03/1999 |
| 54 | Image 56: | PIC_0101.JPG | Uploaded 12/03/1999 |
| 55 | Image 57: | PIC_0121.JPG | Uploaded 12/03/1999 |
| 56 | Image 58: | PIC_0133.JPG | Uploaded 12/03/1999 |
| 57 | ... | | |
| 58 | Image 109: | PIC_0301.JPG | Uploaded 17/09/1999 |
| 59 | Image 110: | PIC_0303.JPG | Uploaded 17/09/1999 |
| 60 | Image 111: | PIC_0305.JPG | Uploaded 17/09/1999 |
| 61 | Image 112: | PIC_0306.JPG | Uploaded 17/09/1999 |
| 62 | ... | | |
| 63 | Image 333: | PIC_0901.JPG | Uploaded 02/01/2000 |
| 64 | Image 334: | PIC_0902.JPG | Uploaded 02/01/2000 |
| 65 | Image 335: | PIC_0909.JPG | Uploaded 02/01/2000 |
| 66 | Image 336: | PIC_0921.JPG | Uploaded 02/01/2000 |

SYSTEM INCLUDING A DIGITAL CAMERA AND A DOCKING UNIT FOR COUPLING TO THE INTERNET

CROSS REFERENCE TO RELATED APPLICATIONS

Reference is made to commonly assigned U.S. patent application Ser. No. 09/620,890, filed Jul. 21, 2000 and U.S. patent application Ser. No. 09/620,889, filed Jul. 21, 2000 by M. Krishna Bandaru et al., the disclosures of which are incorporated herein by reference.

FIELD OF THE INVENTION

The present invention relates to digital cameras which include a viewable display and, more particularly, to a system that uses such a digital camera to receive and display information from the Internet.

BACKGROUND OF THE INVENTION

Current digital cameras can connect to a host computer via a dock in order to transfer images to the PC, and in some cases to download pictures and other types of files, such as MP3 audio files, etc. from the PC to the camera. One example is the Kodak EasyShare DX3500 digital camera, which is sold with an optional docking unit. In this case, pictures can be downloaded from the PC to the camera, and the camera can later be used to view the images on the camera's LCD image display in "slideshow" mode.

Current digital picture frame display devices, such as the Kodak Smart Picture Frame sold by Eastman Kodak Company, Rochester, N.Y., can connect to the Internet via a phone line. They allow images to be viewed, uploaded for printing, and downloaded for viewing via a display slideshow mode. They also allow web pages with the weather, stock reports, etc. to be viewed. However, such devices cannot be used to capture images, and cannot be used in a portable mode, since they are not battery operated.

The transfer of digital images from a user to a service provider is becoming more popular and more important. Typically, a digital camera user captures a group of digital images that are stored on a removable memory card. These images can be transferred from the memory card and stored, for example, on a hard drive or other non-volatile memory associated with the user's computer. While these images can be printed on a local printer, such as an ink jet printer, it is often simpler and less expensive for the user to have the images printed by a service provider. There are numerous services that can be provided using digital images, such as storing the images on-line, printing the images, or producing digital storage media (e.g. CD-R discs) with duplicate copies of the digital images. These services can be provided at a remote location, typically a location in a different city, by the service provider. When services are ordered from a service provider, the images need to be uploaded using a channel such as the Internet.

Digital images, from digital cameras or scanned photographic film, can be uploaded to a web site for viewing, as described in commonly assigned U.S. Pat. No. 5,666,215 to Fredlund et al. Using a web browser, a group of these digital images can be viewed and selected for printing, for example using the Kodak Photonet Service. The user can select the size of each print to be produced, and the quantity of prints to be made from each image.

Some web sites, such as the site provided by OFOTO at www.ofoto.com, enable a user to upload a group of digital images for sharing with others over the Internet, and for providing digital printing services. This site permits a user to obtain an account using his e-mail address as the account name, and to provide a password and address information. The user can then upload a group of images. After all the images are uploaded, the user can select particular images for printing or sharing with third parties designated by the user. The user can return to this site at a later date, enter their e-mail address and password, and upload or print additional images.

A problem with the prior art is that capturing, uploading, and conveniently viewing digital images via the Internet requires that three expensive devices be used, a digital camera for capturing images, a desktop computer for uploading the images to a website for sharing, and a picture frame for viewing the images in a convenient location, such as on a nightstand or living room table. Purchasing and using these three devices is expensive and difficult.

SUMMARY OF THE INVENTION

It is an object of the present invention to facilitate a user being able to use a digital camera for directly communicating with a service provider.

It is another object of the present invention to permit the user of a digital camera with a display to make use of that display after communication has been established between the digital camera and a service provider, in order to receive and display images captured by others.

It is another object of the present invention to provide a digital camera having a large color image display that is used with a docking unit to provide an attractive looking digital picture frame.

Another object of this invention is to provide a low cost, easy-to-use system for capturing digital image, sharing the digital images with others, receiving digital images from others, and displaying these received digital images and other useful information conveniently.

These objects are achieved by a system including a digital camera and a docking unit to permit the digital camera to be coupled to a channel, comprising:
 a) the digital camera including:
  i) a viewable display;
  ii) an image capture lens;
  iii) an image sensor for receiving a visual image provided by the capture lens to produce an image signal, a processor responsive to the image signal for producing a digital image so that the viewable display can respond to such image to provide a viewable image; and
  iv) a docking interface to permit the digital camera to be connected to the docking unit; and
 b) the docking unit including:
  i) means for receiving the docking interface in the digital camera and for connecting the digital camera to the docking unit;
  ii) means for providing power to the digital camera; and
  iii) means for interconnecting the docking unit to the channel; and
 c) the processor providing communication through the docking unit so that it receives digital images via the channel and causes such digital images to be displayed on the viewable display.

These objects are also achieved by a-method for connecting a digital camera to a channel such as the Internet, comprising the steps of:

a) providing a digital camera having a viewable display and a docking unit for receiving the digital camera; and b) providing communication over the channel to the docking unit which directs image data to the docked digital camera that provides viewable images on the viewable display of such camera.

ADVANTAGES

It is an advantage of the present invention to use the same digital camera for capturing and displaying captured digital images, and for displaying images provided by others which have been stored by a service provider and communicated by the service provider over a channel such as the Internet.

It is a further advantage of the present invention to provide a system having a digital camera and a docking unit, to permit the direct connection of the digital camera to the service provider in a cost effective manner, eliminating the need for an intermediate device such as a personal computer.

It is another advantage of the present invention to provide a system having a digital camera and a docking unit which allows the display on the digital camera to be viewable, thus providing an attractive way to store the digital camera when it is not capturing images, and to ensure that the camera batteries are recharged.

BRIEF DESCRIPTION OF THE DRAWINGS

FIGS. 7A and 7B depict service account information used to determine the content of files downloaded from the service provider to the digital camera;

DETAILED DESCRIPTION OF THE INVENTION

In this invention, the digital camera includes a large viewable image display (e.g. a color LCD, Organic Light Emitting Display [OLED] or the like). The camera operates as a normal digital camera to capture images. It also connects to a docking unit, which provides power and network connectivity, for example via a phone line. The camera is inserted into the dock with the lens facing away from the user and the viewable display facing towards the user. The docking unit is typically located in the master bedroom, kitchen, etc., rather than next to a computer in the office or den. The combination of the camera and docking unit form a system that both transfers the captured digital images to a service provider via the Internet, and displays images and other information downloaded from a service provider on the large viewable camera display, thus providing the capabilities of a digital picture frame.

When the camera is connected to the docking unit, the system can automatically upload any newly captured images to a network service provider for storage and/or printing. This can be done using the methods described in commonly assigned U.S. patent application Ser. No. 09/569,079, filed May 11, 2000 by Parulski et al., the disclosure of which is herein incorporated by reference.

After the images are uploaded, the system then begins to automatically receive and store various types of information, in accordance with selections made by the user when they purchased or configured their system. Examples of this information include digital still or motion images, such as favorite photographs or video snippets stored on the network, either by the user or by a third party which authorizes the user to access this information, and presented in a slideshow type format. The system also stores and displays information provided by Internet web sites, such as the local weather, headline news, stock prices, sport scores, etc, which is of interest to the user. The various information can be displayed on the viewable display either by automatically cycling though the information, or in response to user menu selections.

Once disconnected from the dock, the content downloaded from the Internet (e.g. local weather, etc.) can still be viewed on the camera viewable display, so that the user can more easily read the information, or read the information in a different room, or while on-the-go. When the user selects the camera capture mode, the information ceases to be presented on the camera display, and the camera functions as a digital image capture device.

Figure 1:
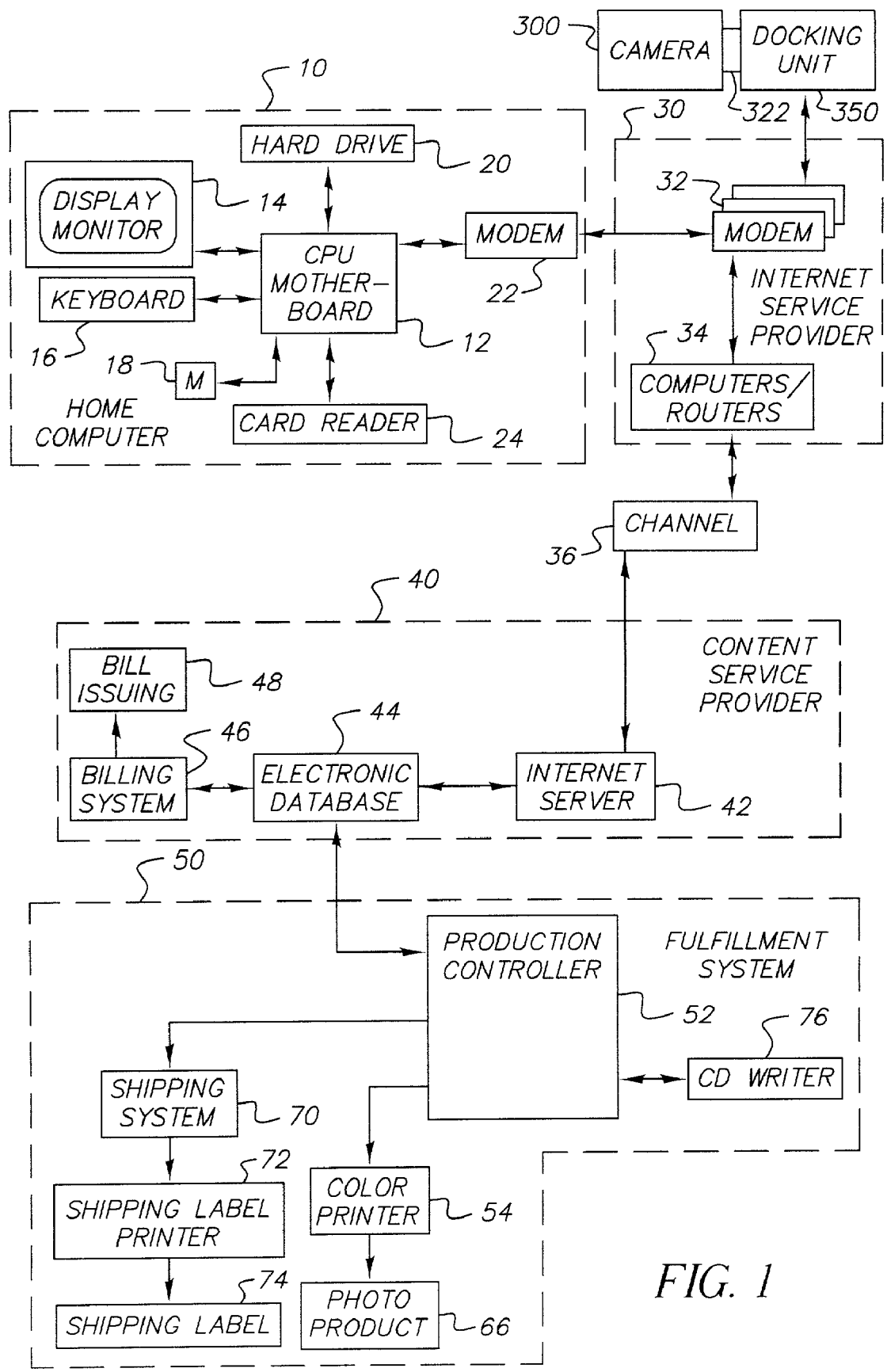
FIG. 1 depicts a block diagram of a system that implements this invention.

FIG. 1 depicts a block diagram of a system that implements the present invention. As shown in FIG. 1, the system includes a digital camera 300 which includes a docking interface 322 to facilitate connection with a docking unit 350. The docking unit 350 includes a modem 370 (shown in FIG. 4) for establishing a connection with a network service provider 30, such as an Internet service provider (ISP), to provide a network connection to a channel 36, such as the Internet. The system further includes a content service provider 40, which communicates with camera 300 via the ISP 30. The content service provider 40 receives and stores digital image files uploaded from the digital camera 300, and stores and downloads digital image files and other information to the camera 300. The content service provider 40 includes an Internet server 42 for communicating with the Internet (e.g. channel 36). The content service provider 40 also includes an electronic database 44, which is located remote from the digital camera 300, for storing digital images and other information. The content service provider 40 also includes a billing system 46, which provides bill issuing 48.

The various portions of the content service provider 40 can be located in a single building or complex of adjacent buildings, or can be geographically dispersed over several sites in different cities or even different continents. For example, the Internet server 42, the electronic database 44, and billing system 46 can be provided by computers located in different cities and interconnected via a suitable digital communications network, such as the Internet. Furthermore, the electronic database 44 can itself be distributed over several computers in several different locations.

The system also includes a home computer system 10 which can be used to order and configure the services and information provided by the content provider 40, such as the information (e.g. current stock prices for companies of interest to the user) that is automatically downloaded from the content provider 40 to the digital camera 300. Alternatively, the user can order and configure the services and information via a retail outlet, via a telephone call to a representative of the service provider, via a mail-in order form, or the like.

The home computer 10 includes a CPU motherboard 12, having for example, an Intel Pentium processor as well as RAM memory. The CPU motherboard 12 executes software stored on a hard drive 20, for example, the well known Windows ME operating system software and the Internet Explorer web browser software, both provided by Microsoft Corp. of Redmond, Wash. The CPU motherboard 12 is coupled to a display monitor 14 and a keyboard 16. A mouse 18 permits the user to readily communicate with the CPU motherboard 12. The home computer 10 also includes a dial-in modem 22 for communicating with the ISP 30 in order to connect to a channel 36, such as the Internet. The CPU motherboard 12 communicates with a card reader 24, which can read and write data on a removable flash memory card 330 (shown in FIG. 3) used in the digital camera 300.

The ISP 30, for example, Earthlink Network, Inc. of Pasadena, Calif., includes banks of modems 32, one of which is connected to communicate with the modem 370 in the docking unit 350, or the modem 22 of the customer's computer 10. The modem 32 in turn communicates with computers/routers 34 in order to provide a connection to the channel 36 using equipment and techniques well known to those skilled in the art.

The content service provider 40 communicates with a fulfillment system 50, which is comprised of one or more computers and associated peripherals for producing photo products, such as hardcopy prints, album pages, photo mugs, PictureCD discs, and the like. The fulfillment system 50 includes a computer that serves as a production controller 52, and controls one or more color printers 54, which can produce photo products 66 such as album pages or standard hardcopy prints. The hardcopy prints can be of various sizes, and can be sold in frames. The production controller 52 is also connected to a CD writer 76, which can produce PictureCDs having digital images and application software for using the digital images. The production controller 52 can optionally be connected to devices (not shown) for producing other types of photo products 66 such as t-shirts, coffee mugs, etc. incorporating one or more images uploaded by the user. The production controller 52 also controls a shipping system 70 which controls a shipping label printer 72 to produce a shipping label 74. The shipping label 74 is attached to a shipping container (e.g. a cardboard box containing packing material) that contains and protects the photo product 66 during shipment (e.g. via air express mail, ground carrier, etc.) to the user or the user's designee.

In addition to receiving and storing digital images produced by digital cameras, the content service provider can scan photographic film using appropriate equipment (not shown), or receive digital images produced by scanning film by a different service provider, to produce digital images that can be stored in the electronic database 44, as described in commonly assigned U.S. Pat. No. 5,666,215 to Fredlund et al., the disclosure of which is incorporated herein by reference.

The electronic database 44 provides information describing numerous photo products that can be provided by the fulfillment system 50, as described in commonly assigned U.S. patent application Ser. No. 09/576,288, filed May 23, 2000 by Parulski et al., the disclosure of which is incorporated herein by reference. This includes information describing photo product options, for example, album features such as providing various background colors or textures, page numbers, page captions, image captions, etc. The album pages can be bound in a cover, or can include holes to permit the pages to be inserted into a standard binder, such as a three-ring binder. These album feature options can be demonstrated via software programs, for example, JAVA applets, MPEG or QuickTime movies, or Shockwave files, which depict the functionality of features that the customer can choose.

The electronic database 44 includes information describing each customer account, including user billing information, a user profile for providing information content to the user, and user image storage information. The billing information can include a payment identifier for the user, such as a charge card number, expiration date, and user billing address. The user profile indicates the types of information that the user wants to receive from the Internet when their digital camera 300 is mated with the docking unit 350. The user image storage information includes a list of images uploaded by the user and stored in the electronic database 44. The electronic database 44 also provides long-term storage of the uploaded images for each user. In this embodiment, stored images are accessible (e.g. viewable) via the Internet by authorized users, as described, for example, in commonly assigned U.S. Pat. No. 5,760,917 to Sheridan, the disclosure of which is herein incorporated by reference. The electronic database 44 can be contained on the same computer as the network server 42, or can utilize a separate computer, or can be distributed over several computers at the same physical site, or at different sites.

On a regular basis (e.g. monthly) or alternatively whenever a photo product 66 is purchased by the user, the electronic database 44 communicates with a billing system 46 to verify that the payment identifier (e.g. credit card or debit card number) provided by the customer is valid, and to debit the account for the purchase or the monthly service fee for providing information to the user and storing user images. As shown in block 48, the bill is issued. The customer's account that is debited can, of course, be located at a remote financial institution.

Figure 3:
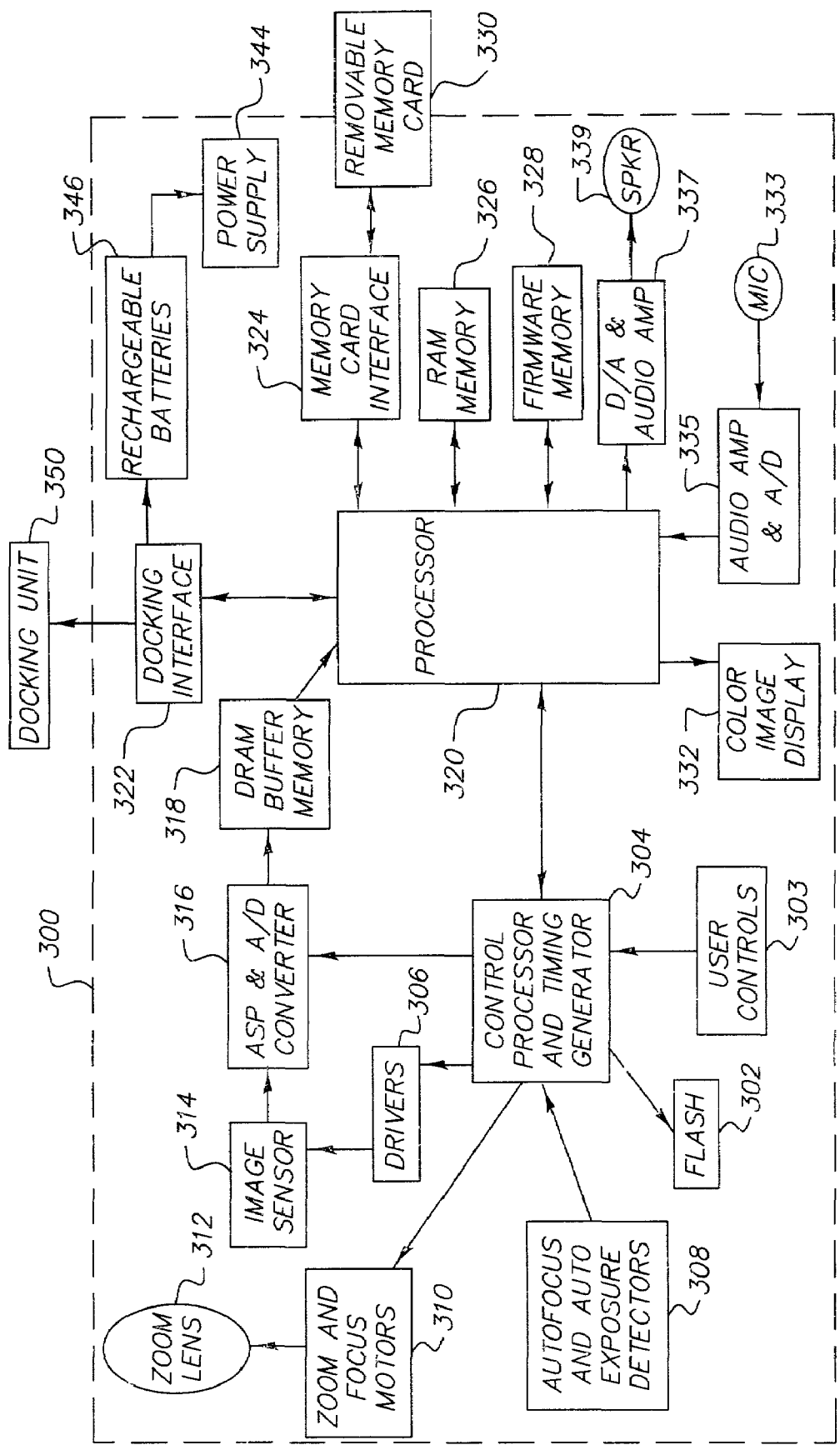
FIG. 3 is a block diagram of the digital camera that can be a part of the system of this invention.

FIG. 3 is a block diagram showing the digital camera 300 in more detail. Electrical power for all of the circuits of the digital camera 300 is provided by rechargeable batteries 346 via power supply 344. The rechargeable batteries 346 are recharged via power supplied by the docking unit 350 to the docking interface 322. The digital camera 300 produces digital images that are stored on the removable memory card 330. The digital camera 300 includes a zoom lens 312 having zoom and focus motor drives 310 and an adjustable aperture and shutter (not shown). The zoom lens 312 focuses light from a scene (not shown) to provide an optical image focused on an image sensor 314, for example, a single-chip color CCD image sensor, using the well known Bayer color filter pattern. The image sensor 314 is controlled by clock drivers 306. The zoom and focus motors 310 and the clock drivers 306 are controlled by control signals supplied by a control processor and timing generator circuit 304. The control processor and timing generator 304 receives inputs from autofocus and autoexposure detectors 308 and controls a flash 302. The analog image signal from the image sensor 314 is amplified and converted to digital data by the analog signal processing (ASP) and analog-to-digital (A/D) converter circuit 316. The digital image data from the A/D converter 316 is stored in a DRAM buffer memory 318 and subsequently processed by a processor 320 controlled by the firmware stored in the firmware memory 328, which can be flash EPROM memory.

The processed digital image file is provided to a memory card interface 324, which stores the digital image file on the removable memory card 330. Removable memory cards 330 are known to those skilled in the art. For example, the removable memory card 330 can conform to the Compact Flash interface standard, such as is described in the *CompactFlash Specification Version* 1.3, published by the CompactFlash Association, Palo Alto, Calif., Aug. 5, 1998. Other types of removable memory cards, including Smart Media cards, PC cards, SD cards, or Memory Stick cards, and other types of digital memory devices, such as magnetic hard drives, magnetic tape, or optical disks, could alternatively be used to store the digital images.

The processor 320 performs color interpolation followed by color and tone correction, in order to produce rendered sRGB image data. The rendered sRGB image data is then JPEG compressed and stored as a JPEG image file on the removable memory card 330. The processor 320 also creates a smaller size digital image which can be created as described in commonly assigned U.S. Pat. No. 5,164,831 to Kuchta et al., the disclosure of which is herein incorporated by reference. This smaller size image is stored in RAM memory 326 and supplied to the color image display 332, which displays the smaller sized, processed digital image for the user to review. The color image display 332 provides a viewable display, and can use an LCD display, an OLED display, or other types of display technologies.

The digital camera 300 is controlled by user controls 303, some of which are shown in more detail in FIG. 5. The user controls 303 include a shutter release (e.g. a capture button) 380, which initiates a picture taking operation, up/down buttons 382, left/right buttons 384, and select button 386. The graphical user interface displayed on the color LCD image display 332 is controlled by the user interface portion of the firmware stored in the firmware memory 328. The camera user interface also includes microphone 333 which connects to an audio amplifier and A/D converter 335, to provide a digital audio signal to the processor 320. The camera user interface can also include a digital-to-analog (D/A) converter and audio amplifier 337, and a miniature speaker 339, which plays back the recorded audio, and also makes audible sounds when a new picture is taken, or when the user changes modes or advances to review the next stored image. The digital camera 300 can also include a video output driver and connector (not shown) for displaying the captured images on a TV (not shown).

The JPEG file stored on the removable memory card 330 uses the so-called "Exif" image format defined in "Digital Still Camera Image File Format (Exit)" version 2.1, July 1998 by the Japan Electronics Industries Development Association (JEIDA), Tokyo, Japan. This format includes an Exif application segment that stores particular image metadata, for example the date and time the picture was captured, the lens f/number and other camera settings, and image captions or comments that can be selected or entered by the camera user.

Figure 6:
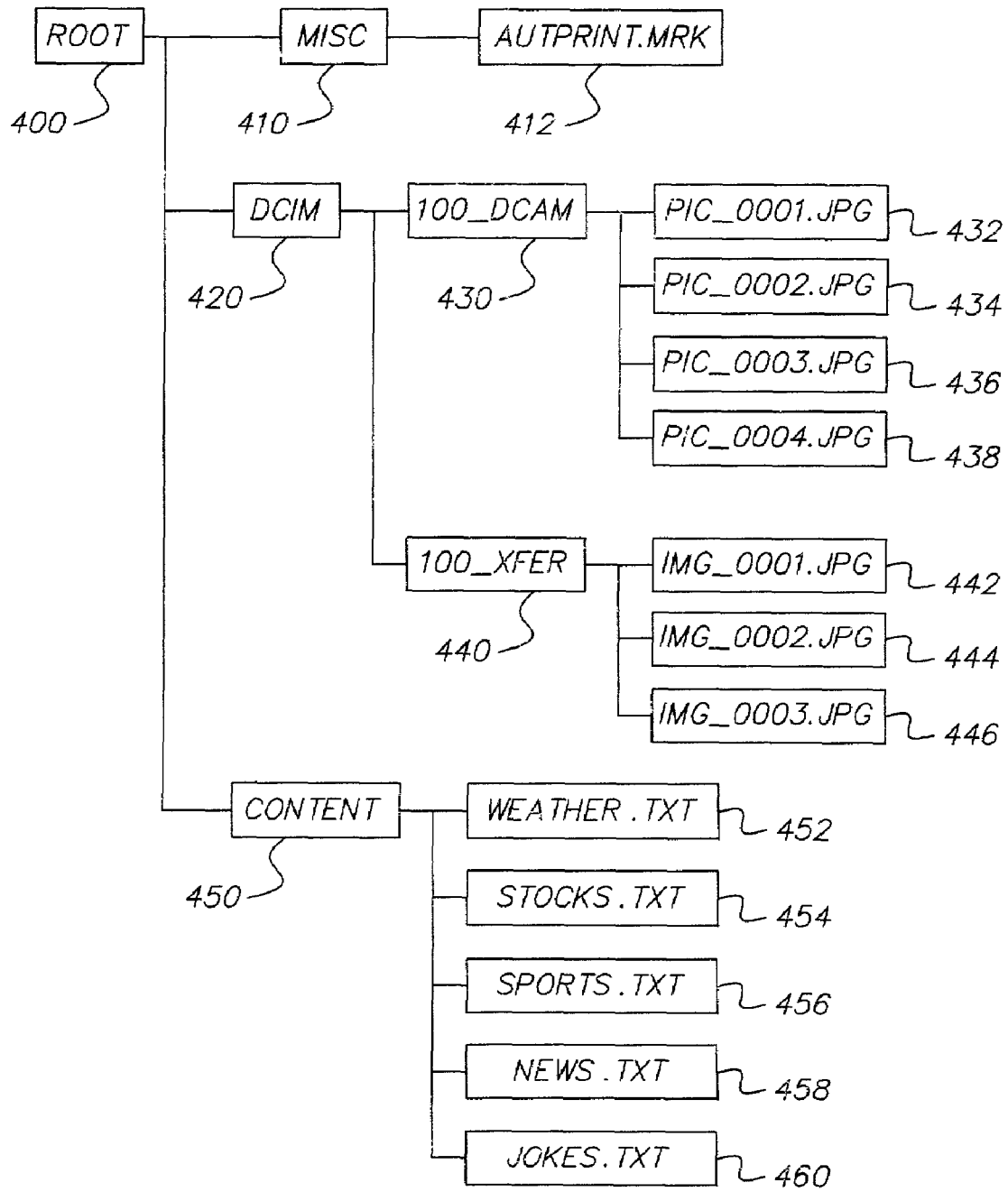
FIG. 6 depicts the organization of images and other files stored on the removable memory card of the digital camera.

The Exif image files, containing the JPEG compressed main image, thumbnail image, and the image metadata, are stored on the removable memory card 330 using a directory structure conforming to the so-called "DCF" rules defined in "Design Rule For Camera File System" version 1.0, December 1998 by the Japan Electronics Industries Development Association (JEIDA), Tokyo, Japan. An example directory structure recorded on DOS formatted removable memory card 330 by the camera 300 is depicted in FIG. 6. Three directories are recorded under the root directory 400, MISC directory 410 containing a file 412 named AUTPRINT.MRK, DCIM directory 420 which contains subdirectories 430 and 440, and a CONTENT directory 450. File 412 is a Digital Printer Order Format (DPOF) file, which specifies images to be printed, as will be described later. Subdirectory 430 is named 100_DCAM, to conform to the DCF rules, and contains four JPEG compressed Exif image files, PIC_0001.JPG 432, PIC_0002.JPG 434, PIC_0003.JPG 436, and PIC_0004.JPG 438. Files 432, 434, 436, which have been captured by the digital camera 300.

Subdirectory 440 is named 101_XFER to conform to the DCF rules. The purpose of subdirectory 440 is to provide a known location for the digital camera 300 to store image files on removable memory card 330 which are downloaded from the content service provider 40 when the digital camera is connected to the docking unit 350. The files stored in subdirectory 440 include three JPEG compressed image files, file 442 named IMG_0001.JPG, file 444 named IMG_0002.JPG, and file 446 named IMG_0003.JPG. There JPEG files have been previously downloaded from the content service provider 40 and can be displayed on the color LCD image display 332, as will be described later in reference to FIG. 2. Instead of JPEG image files, other types of image file formats, including TIFF, GIF, JPEG2000, and the like, could be used. The size of the image files stored in subdirectory 440 can be significantly lower resolution (e.g. can have fewer lines and fewer pixels per line) than the images captured by the digital camera, since they are only used to provide a displayable image but are not used to provide prints. As a result, a large number of downloaded images can be stored on the removable memory card 330. Because the full resolution images are retained by the content service provider, high quality reprints of these images can be obtained by transferring the full resolution image data stored at the content service provider 40 to the fulfillment service 50 to produce photo products 66.

Subdirectory 450 is named CONTENT, and provides a known location for image processor 320 to store content information (e.g. stock quotes, weather reports, and the like), downloaded from the content service provider 40 when the digital camera is connected to the docking unit 350. Subdirectory 450 contains a number of files, one for each type of information that is downloaded from the content service provider according to the selections made by the user when the user's service account was established. The files include file 452 named WEATHER.TXT, file 454 named STOCKS.TXT, file 456 named SPORTS.TXT, file 458 named NEWS.TXT, and file 460 named JOKES.TXT. Instead of using text (TXT) files, the files could use other document formats, or could be HTML web pages, or graphic or raster image files.

The graphical user interface displayed on the color LCD image display 332 is controlled by user controls 303. The digital camera 300 can also include a video output driver and connector (not shown) for displaying the captured images on a TV (not shown). The user uses the user controls 303 to set the camera in the "capture" mode prior to capturing images. The user sets the camera in the "review" mode in order to review the captured images (e.g. image files 432, 434, 436 and 438 in FIG. 6.) The user can then review the image files and delete undesirable images the user controls 303.

The user can also use the user controls 303 to set the camera in a "place order" mode. In this mode the user can select images for printing, and can specify how many copies to make. The camera creates an image utilization file, as described in commonly assigned U.S. Ser. No. 09/004,046 filed Jan. 7, 1998 to Ward et. al., the disclosure of which is herein incorporated by reference. This image utilization file 412, named AUTPRINT.MRK, is an ASCII text file containing these instructions, and is known as a Digital Print Order Format (DPOF) file.

The user can also review the downloaded image files stored in subdirectory 440. Using user controls 303, the user reviews the image files, (e.g. files 442, 444, 446 in FIG. 6) and can selects one or more images that they would like to reprint. This might typically occur as the user receives images shared by friends on the color LCD image display 332. To order reprints, the user selects, using user controls 303, selects which images to print, how many copies to make, etc. The Digital Print Order Format (DPOF) file 412 is then updated to include his print order, and to indicate via the image pathname, that the images to be printed are already stored at the content service provider 40.

After a series of images have been taken and stored on the removable memory card 330, the camera 300 is connected to the docking unit 350. The docking interface 322 in the digital camera 300 includes an electrical connector that mates with a complimentary connector in the docking unit. The removable memory card 330 can also be inserted into a memory card reader 24 in the user's host computer 10 shown in FIG. 1, so that the images can be displayed, stored, modified, incorporated in documents, etc.

Figure 4:
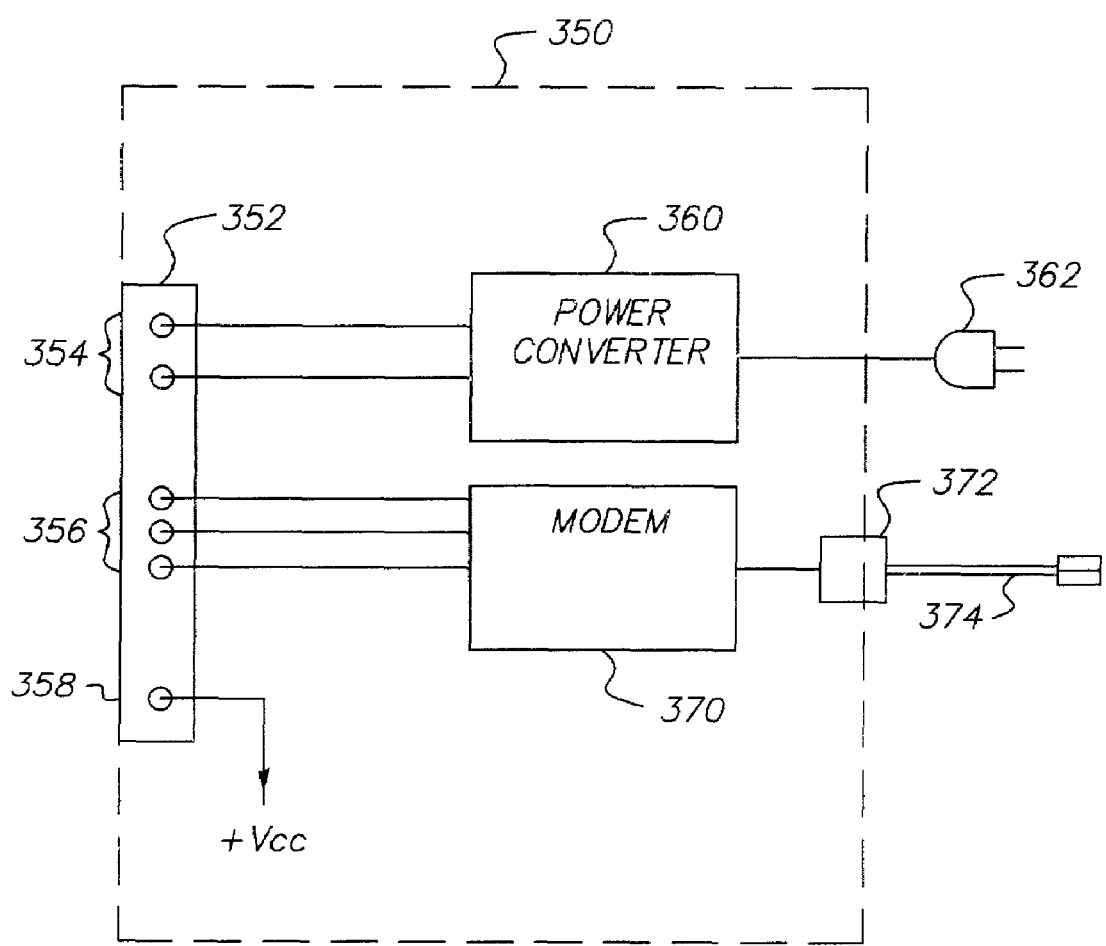
FIG. 4 is a block diagram of the docking unit that can be a part of the system of this invention.

FIG. 4 is a block diagram of the docking unit 350 that forms part of the preferred embodiment of the system of this invention. The docking unit 350 includes a connector 352 which mates with the docking interface 322 of the digital camera 300. The docking unit 350 supports the digital camera, as shown in FIG. 5B, so that the color LCD image display 332 of the digital camera 300 can be viewed. In a preferred embodiment, the docking unit 350 includes some type of power supply, such as a power converter 360 which receives power from the AC plug 362, for recharging the rechargeable batteries 346 of the digital camera 300, which is supplied to the digital camera 300 via connector pins 354 of connector 352. The docking unit also includes a telephone modem 370 which connects to a telephone wall jack (not shown) via a standard phone cable 374 connected to the phone connector 372, and which also connects to the digital camera via connector pins 356 of connector 352. The modem provides a network connection for interconnecting the docking unit to a channel, such as the Internet. Many other types of network connections are possible, including wireless connections, higher speed network connections such as cable modem connections, and the like. Connector 352 also includes a connector pin 358, which is connected to a fixed potential (e.g. a +Vcc potential) when the camera 300 is connected to the docking unit 350. In alternative embodiments, the modem 370 could be included in the digital camera 300, or the docking unit 350 could include a low cost microprocessor.

The firmware memory 328 of the digital camera 300 includes one or more phone numbers for accessing the content service provider. The alternate or back-up phone numbers are provided in the event that the first number called is busy or becomes inaccessible. When the camera is connected to the docking unit 350, the presence of the +Vcc potential on pin 358 is detected. The image processor 320 then dials an appropriate number to access the content service provider 40.

Figure 5A:
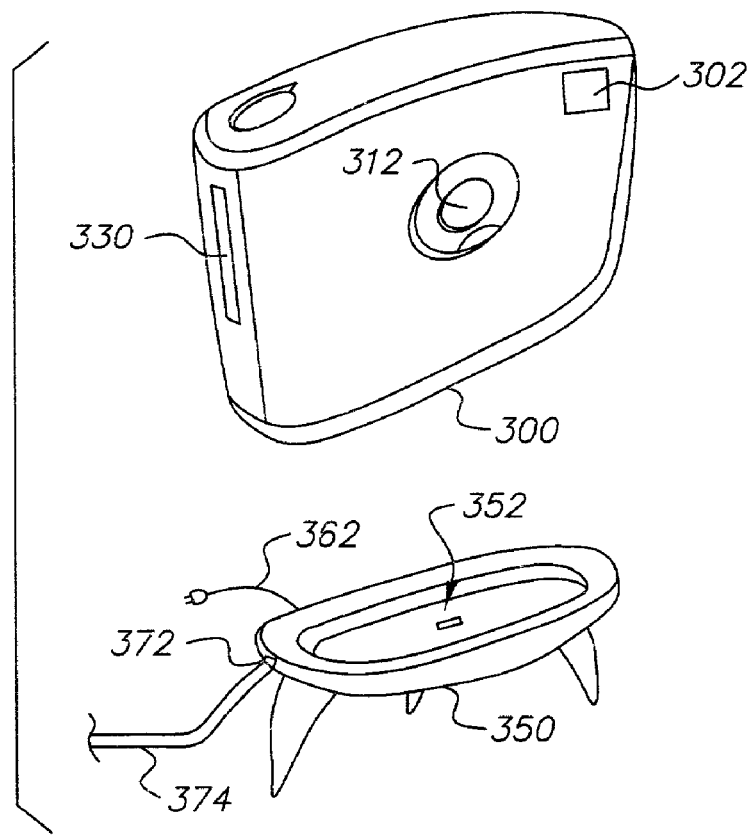
FIG. 5A is a front view of the digital camera and the docking unit when they are disconnected.
Figure 5B:
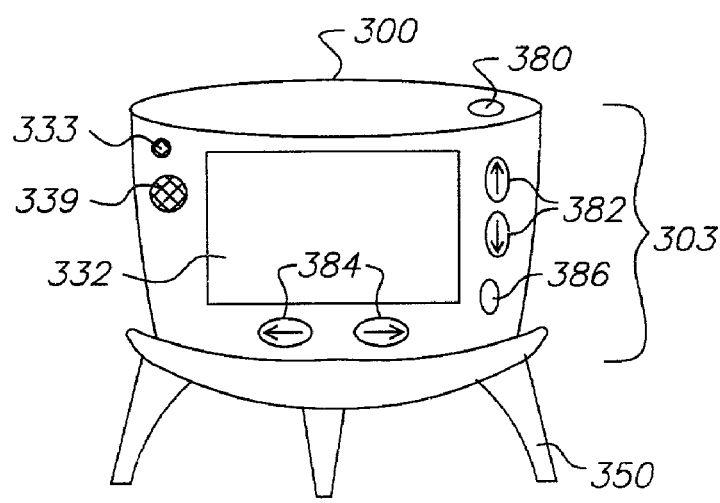
FIG. 5B is a rear view of the digital camera docked in the docking unit.

FIG. 5A is a front view of the digital camera and the docking unit when they are disconnected. As described earlier in reference to FIG. 3, the digital camera 300 includes a zoom lens 312 and a flash 302 used when capturing digital images, and a removable memory card 330 which stores the captured digital images. As described earlier in reference to FIG. 4, the docking unit 350 includes a connector 352 which mates with the docking interface 322 of the digital camera 300. The docking unit 350 includes an AC plug 362 for supplying power, and a phone connector 372 which connects to a telephone wall jack (not shown) via a standard phone cable 374.

FIG. 5B is a rear view of the digital camera 300 docked in the docking unit 350. As described earlier in relation to FIG. 3, the camera includes a color image display 332 and a number of user controls 303. The user controls 303 include a shutter release 380, up/down buttons 382, left/right buttons 384, and select button 386. The camera also includes a microphone 333 and a speaker 339. These provide a user interface that will be described in detail in reference to FIG. 8A–C.

Figure 2:
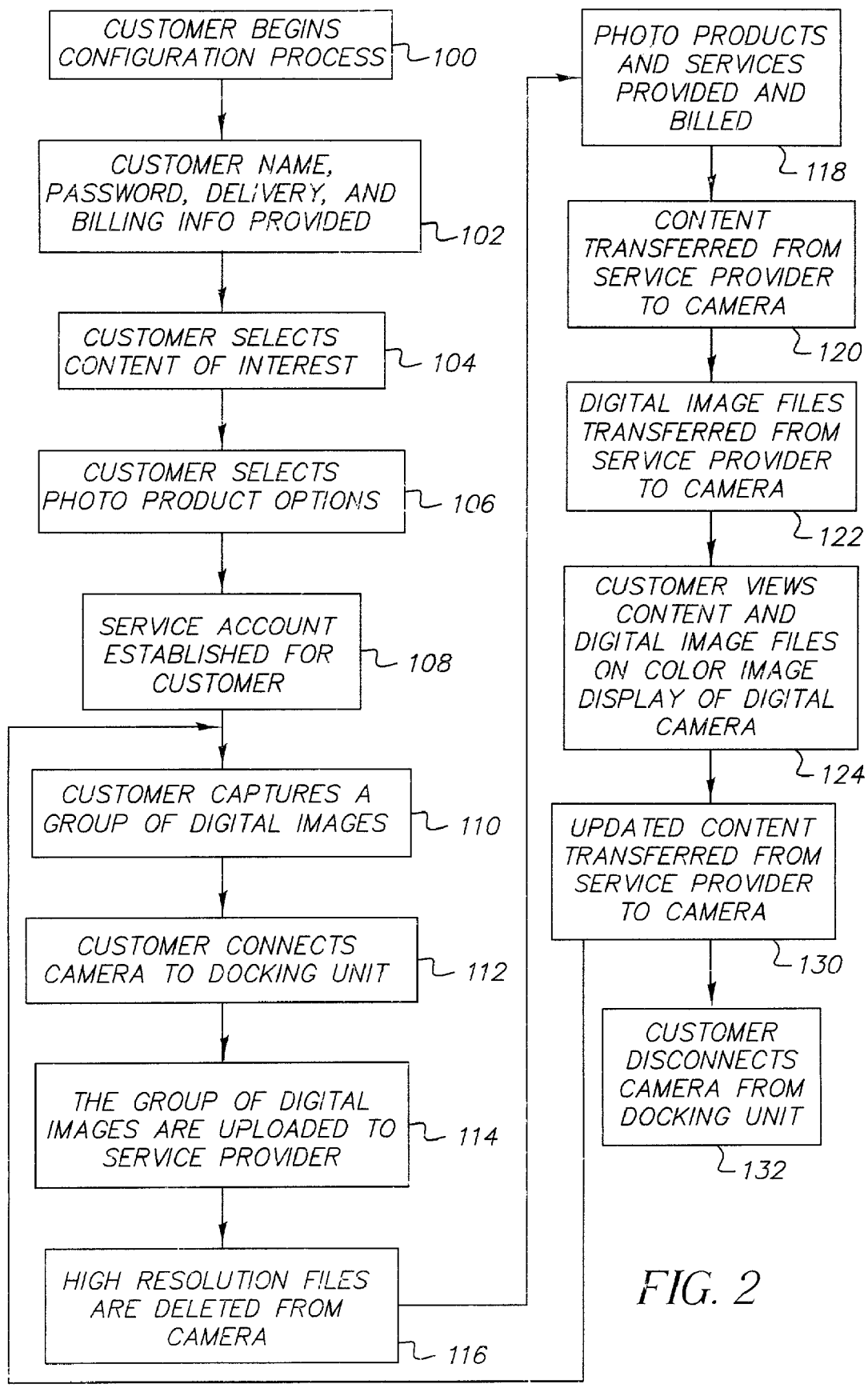
FIG. 2 is a flow diagram showing the process of capturing images, communicating with a service provider, and displaying images on a viewable display of the digital camera.

Turning now to FIG. 2, there is shown a flow diagram showing the process of capturing images, communicating with a service provider, and displaying images on a viewable display of the digital camera. As shown in block 100, the customer begins the configuration process. This can be done by the customer, using their home computer 10, or alternatively at a retail establishment, when the digital camera 300 and docking unit 350 are purchased or leased. In either case, this can be done (by the user or retail clerk) using an Internet connection to the content service provider 40, to initiate the process of establishing an account for the user with the content service provider 40, and providing customer account information which is then stored in the electronic database 44.

In block 102, the customer (possibly with the assistance of the retail clerk) enters their name, selects a password, and provides delivery and billing information. This information identifies the customer and one or more customer's designees (e.g. the person to whom various photo products 66 might in the future be shipped, which can of course be the customer). It includes addresses of both the customer and one or more of the customer's designees. The customer also identifies an account to be debited to pay for the monthly service fees, as well as for any photo product(s) to be purchased. Often this will be a credit card having a payment identifier that specifies the account of the customer to be charged or debited. Frequently, this will be in a financial institution. The payment identifier can be a credit card number that specifies a particular credit card account. As used in this specification, a credit card will also include a debit card.

In block 104, the customer selects the type of content that they would like the content service provider 40 to provide when the digital camera 300 is connected to the docking unit 350. This content information can include stock quotes for particular companies of interest to the customer. It can also include the weather report for one or more regions of interest to the customer. It can also include the names of sports teams of interest to the customer. It can also include the types of news (e.g. national politics, religion, entertainment, etc.) of interest to the customer. It can also include one or more hobbies or types of entertainment of interest to the customer.

In block 106, the customer selects, from a menu of photo product and service options that are available, one or more particular photo products and/or service to be provided by the content service provider 40, and/or the fulfillment system 50 when the images to be captured by the customer's digital camera 300 are uploaded to the content service provider 40. As described earlier in reference to FIG. 1, the photo product options are described U.S. patent application Ser. No. 09/576,288, filed May 23, 2000 by Parulski et al., the disclosure of which is incorporated herein by reference, and include standard service prints in various sizes (e.g. 3"×5" prints, 4"×6" prints, etc.) and various surface finishes (e.g. glossy, matte finish, etc.), as well as customized photo albums. The standard prints can also include text, such as the date the picture was captured or printed. The options can also include storing the digital images in a user account in the electronic database 44, or providing containing the images using CD writer 76.

In block 108, a service account is established for the customer. The information stored in the service account includes the information provided by the customer in blocks 102-106. This includes the content options selected in block 104 and the photo product options selected in block 106. The service account information is preferably stored as part of the electronic database 44 of the content service provider 40.

FIGS. 7A and 7B provides an example of the service account information. The customer name, password, customer e-mail address, customer shipping address, and billing information provided by the customer in block 102 is included in the service account information (lines 3–7). The billing information (e.g. credit card number) and other sensitive information provided in the service account can be encrypted to prevent discovery and unauthorized use.

As shown in the example depicted in FIGS. 7A and 7B, the service account information can also include (lines 9–15) a list of the content of interest to the customer, provided by the customer in block 104. This includes a designation of how often the content information should be updated (line 10), which can be daily, twice daily, hourly, anytime the content changes, etc. It also includes a list of the various topics of interest to the customer (e.g. weather, stocks, sports) selected in block 104. The service account information can include weather categories (line 11) with the cities or other regions of interest to the customer. The service account information can also include a financial categories, such as a stock price category (line 12) providing a list of particular stocks (e.g. EK for Eastman Kodak, INT for Intel Corporation, WMT for WalMart Corp.) of interest to the customer. The service account information can also include a sports category (line 13), providing a list of sports teams of interest to the customer (e.g. Milwaukee Brewers, Milwaukee Bucks, Green Bay Packers). The service account information can also include a news category (line 14), providing a list of new topics (e.g. Rochester, N.Y. local news, U.S. national political news) of particular interest to the customer. The service account information can also include a joke category (line 15), providing a list of humorous topics (e.g. family humor, political humor, sports humor) of interest to the customer.

The PictureCD information (lines 32–35) specifies that a new CD should be created each time 100 images have been uploaded to the content service provider 40 (line 34). It also indicates that designee #1 (e.g. the customer) should receive the order (line 35).

The service print information (lines 37–42) specifies the print size, print finish, and the location, font style, size, and color of the date to be overlaid in the print. The information also indicates that designee #2 should receive the prints (line 42) and the order status (line 42).

The upload time information (lines 44–45) indicates the customer selected upload time. At line 46, it indicates an upload time of 1:00 am eastern standard time (EST). The upload time information could alternatively indicate "immediately".

In block 110, the customer captures a group of digital images using the digital camera 300, as described earlier in reference to FIG. 3. The customer also creates the Digital Print Order File 412 specifying what images are to be printed, and how many copies of each print to produce, and the like.

In block 112, the customer connects the digital camera, including the removable flash memory card 330, to the docking unit 350.

In block 114, the group of images captured by the digital camera are uploaded to the service provider along with the DPOF file 412. The upload time can be selected by the user in block 106. In some cases, this is immediately after the user places the digital camera 300 in the docking unit 350. In other cases, the images are transferred at a specified time, typically at night when the user's computer and phone line are unlikely to be needed. In the event that the consumer needs the phone line while the image uploading is being conducted, the uploading will terminate. This can be noted by the digital camera 300 or the Internet server 42, which can automatically re-establish the connection at a later time, via the network service provider 30, and upload the images which have not yet been transferred.

In block 114, as the group of digital images is uploaded from the digital camera 300 to the content service provider 40, the service account information in FIGS. 7 A and 7B is updated to include a list of the uploaded images. The image list (lines 48–66) provides a list of image identifiers corresponding to the uploaded images. The upload list provides a reference number (e.g. Image 1), and the image name (e.g. PIC_0001.JPG) used when the image was stored on the digital camera 300.

In block 116, the high resolution digital image files are deleted from removable flash memory card 330 of the digital camera 300, since these files are now stored at the service provider. In some embodiments, display resolution versions of these files are maintained in a separate directory, so that they can be displayed on the color LCD image display 332 in "slide show" mode, and so that addition prints or other photo products can be ordered from the digital camera 300 and fulfilled using the high resolution file which is stored by the content service provider 40. This can be done as described in commonly assigned U.S. patent application Ser. No. 09/718,018, filed Nov. 20, 2000 by Endsley et al., the disclosure of which is herein incorporated by reference.

In block 118, the services and photo products selected by the user are provided by the content service provider 40 and/or the fulfillment system 50. The production controller 52 produces the customized photo products using the uploaded images and the service account information stored in electronic database 44. If the user has ordered an album, the uploaded digital images can be automatically arranged on the pages and printed by color hardcopy printer 54 to produce album pages 56 as described in commonly assigned U.S. patent application Ser. No. 09/347,310, filed Jul. 2, 1999 by Loui et al.; U.S. patent application Ser. No. 09/199,724, filed Nov. 25, 1998 by Shaffer et al; and Ser. No. 09/199,639, filed Nov. 25, 1998 by Shaffer et al., the disclosures of which are herein incorporated by reference. If the user has ordered one or more PictureCDs using the uploaded images, the CDs are produced using CD writer 76. In block 106, the user can select to have a CD produced only after a certain number of images (e.g. 100 images) have been uploaded to the content service provider 40, as described earlier in reference to FIGS. 7 A and 7B.

In block 118, the production controller 52 in FIG. 1 also controls the shipping label printer 72 to produce the shipping label 74 using the shipping address of the customer or customer's designee provided in the service account information. The shipping label 74 is attached to the shipping container 64 that is used to ship the photo product 66. Also, the customer account provided in the service account information is billed for the order.

In block 120, content is transferred from the content service provider 40 to the digital camera 300. These files are stored in the content directory 450 described earlier in relation to FIG. 6. If content files with the same names are already stored in the content directory 450, the file creation date of the stored file is examined. If the date and time of the files are the same, the file does not need to be downloaded. However, if the date and time of the file currently stored in content directory 450 is older than the file to be provided by the content service provider 40, the newer file is downloaded to the digital camera 300 and stored on the removable flash memory card 330, overwriting the older file. This enables the latest weather, sports, information to be available to the customer.

In block 122, digital image files are transferred from the content service provider 40 to the digital camera 300. These files are stored in 101_XFER directory 440 as described earlier in relation to FIG. 6.

In block 124, the customer views the downloaded content, downloaded digital image files, and captured display resolution images on the color image display 332 of the digital camera 300.

Figure 8A:
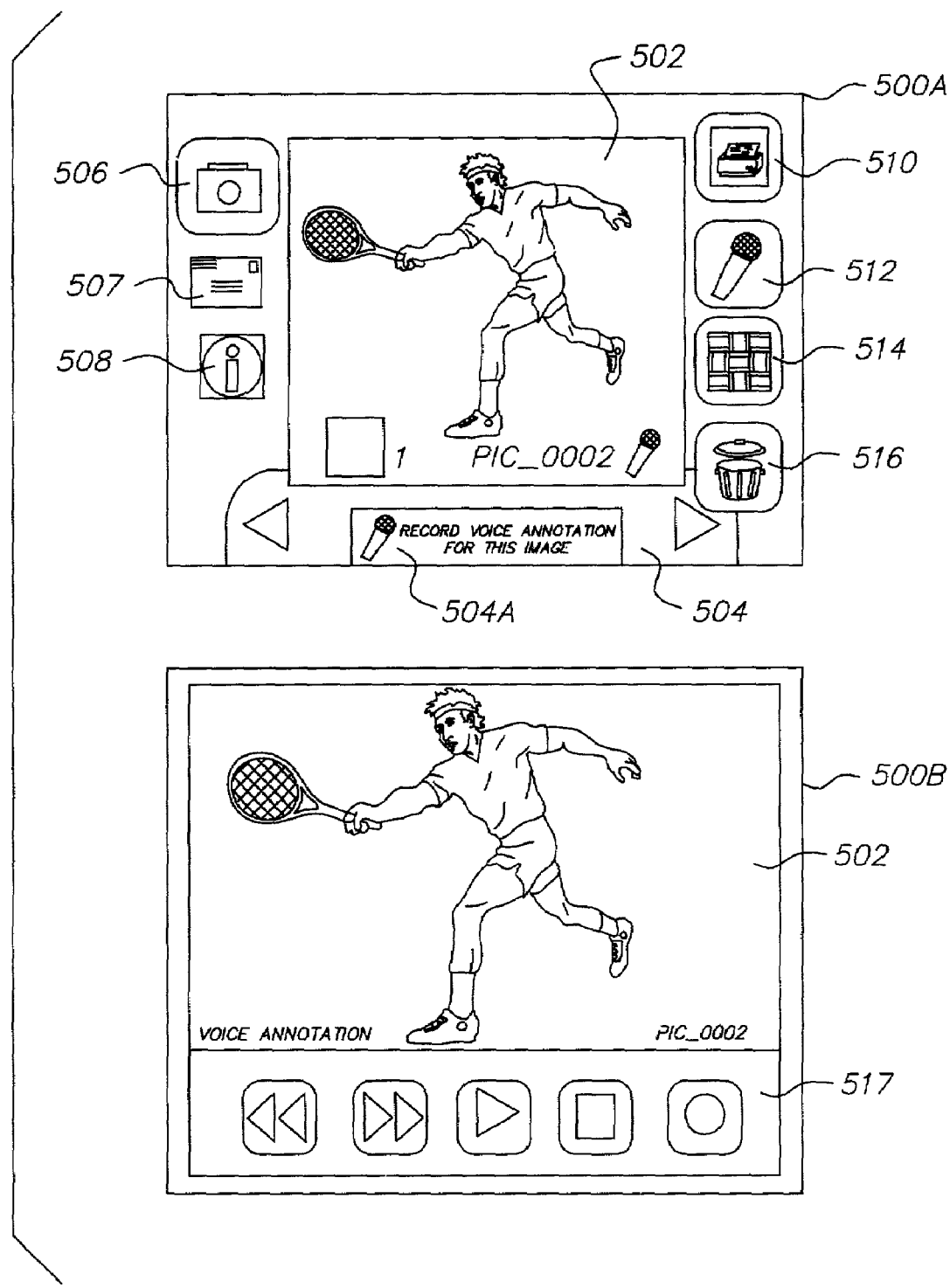
FIG. 8A depicts the user interface when the digital camera is reviewing captured images.

FIG. 8A depicts a user interface screen 500A displayed on the color image display 332 when the digital camera 300 is reviewing captured images. The user interface can use the methods described in commonly assigned U.S. Pat. No. 6,147,703 to Miller et al., and U.S. Pat. No. 6,233,015 to Miller et al., the disclosures of which are herein incorporated by reference. The user interface screen 500A includes an image display window 502 for displaying one or more of the digital images stored on the removable memory card 330. The user interface screen 500A includes three icons 506–508, which indicate the current display mode. Icon 506 is highlighted, indicating that the current display mode is to display images captured by the digital camera 300. In this mode, the digital camera 300 displays the captured images stored in the 100_DCAM directory 430 shown in FIG. 6.

In FIG. 8A, icon 507 can be selected in order to display digital image files transferred from the content service provider 40 to the digital camera 300 in block 122 of FIG. 2, as will be described in relation to FIG. 8B. Icon 508 can be selected in order to display content transferred from the content service provider 40 to the digital camera 300 in block 120 of FIG. 2, as will be described in relation to FIG. 8C.

In FIG. 8A, the camera user has the ability to navigate among the captured images through use of the left and right arrow buttons 384 in FIG. 5B. In addition, the user has the ability perform a number of actions using the digital images stored on the removable memory card 330 of the digital camera 300 by selecting appropriate icons. By selecting icon 510, the user can indicate the quantity and size of prints to be made using the currently viewed image, as described earlier in reference to DPOF file 412 in FIG. 6. By selecting icon 512, the user can annotate the image with a verbal description using the built-in microphone 333. The audio information is recorded into a separate file as described in the Exif 2.1 standard referenced earlier. By selecting icon 514, the user can change the method of viewing images in image display window 502 in order to review multiple images simultaneously, or examine portions of the currently viewed image in enlarged detail. By selecting icon 516, the user can delete the image currently displayed in image display window 502.

An information bar 504 displays information to the user concerning the feature provided by the icon (e.g. icons 510–516), as it is selected by the user. For example, as the user begins to select icon 512 to record audio information, the information bar 504 displays the information shown in 504A, which indicates that this feature enables the user to "record voice annotation for this image".

When the user selects one of the icons 510–512, the user interface screen 500 is updated to provide a new user interface screen corresponding to the selected icon. For example, the user interface screen 500B is displayed when voice annotation icon 512 is selected. The user interface screen 500B includes audio control icons 517 which enable the user to record and playback the voice annotation.

Figure 8B:
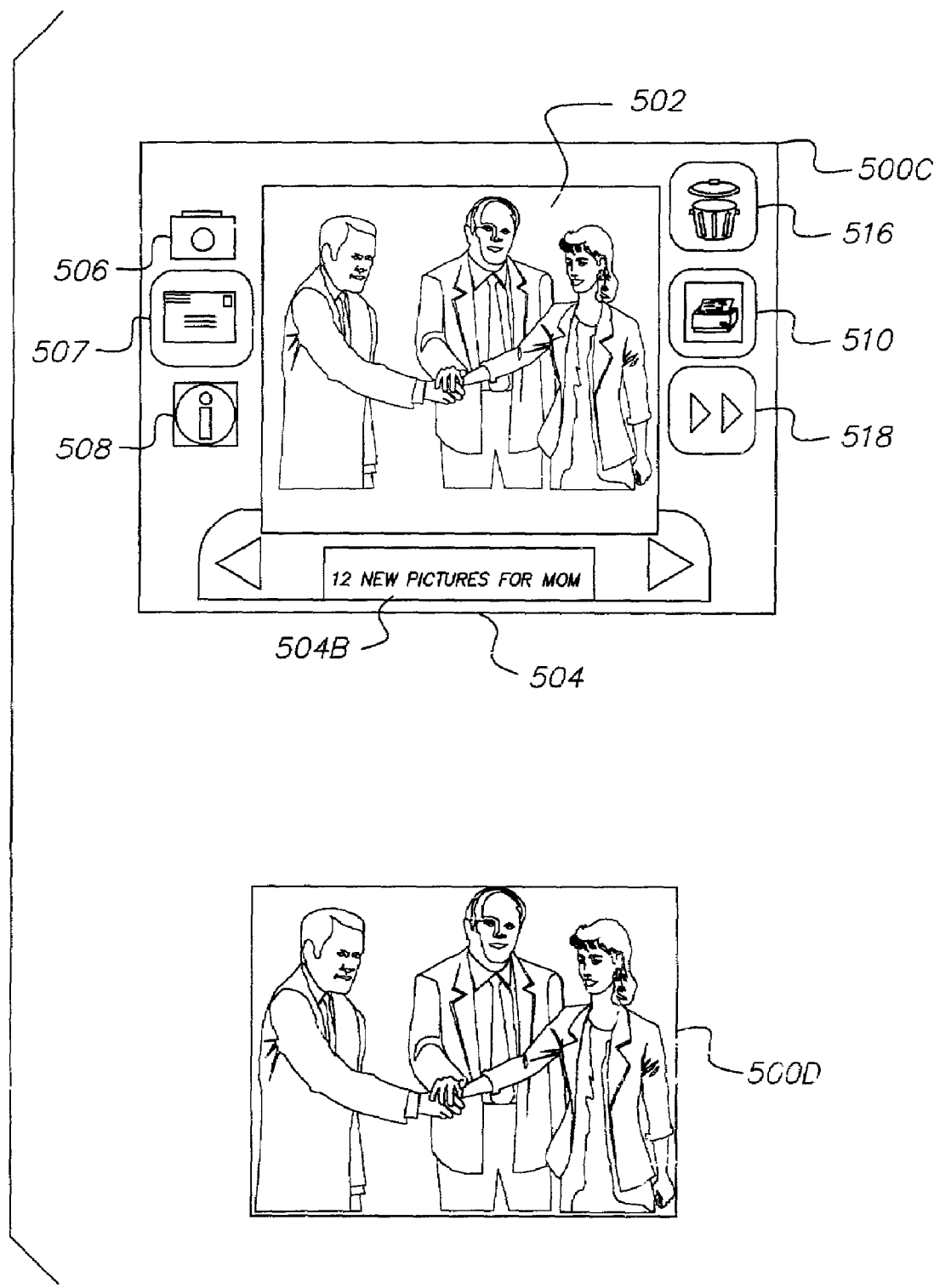
FIG. 8B depicts the user interface when the digital camera is displaying downloaded images from the service provider.

When the user selects icon 507 in FIG. 8A, (or automatically when the digital camera 300 is placed in the docking unit 350, if this is the default mode previously selected by the user), the user interface screen displayed on color image display 332 is user interface screen 500C shown in FIG. 8B. In this mode, the digital camera 300 displays the images transferred from the service provider, which have previously been stored in the 101_XFER directory 440 shown in FIG. 6. Icon 507 is highlighted, indicating that it is the current display mode. The user can change modes by selecting icons 506 or 508.

In FIG. 8B, the camera user has the ability to navigate among the downloaded images through use of the left and right arrow buttons 384 in FIG. 5B. In addition, the user has the ability perform a number of actions by selecting appropriate icons. An information bar 504 displays information 504B to the user concerning the downloaded images. By selecting icon 516, the user can delete the image currently displayed in image display window 502. By selecting icon 510, the user can indicate the quantity and size of prints to be made using the currently viewed image. This information is transferred to the content service provider 40 (FIG. 2), which makes the appropriate prints from the high resolution images stored in the electronic database 44 using the fulfillment system 50.

By selecting icon 518, the user can initiate a slide show presentation of the images transferred from the content service provider 40. The images are displayed, one at a time, on the color image display 332 of the digital camera 300, by displaying the single image on the user interface screen 500D in FIG. 8B. The display time for each image, and the particular images displayed, can use default values (e.g. 10 seconds, all images), or can be manually selected by the user. The default values can also be reprogrammed by the user. For example, the user can select a default value so that when the digital camera 300 is placed in the docking unit 350, the images transferred from the content service provider 40 in block 120 of FIG. 2 are automatically displayed, one at a time, using the user interface screen 500D for a set period of time (e.g. 30 seconds each), until the user presses one of the user controls 303.

Figure 8C:
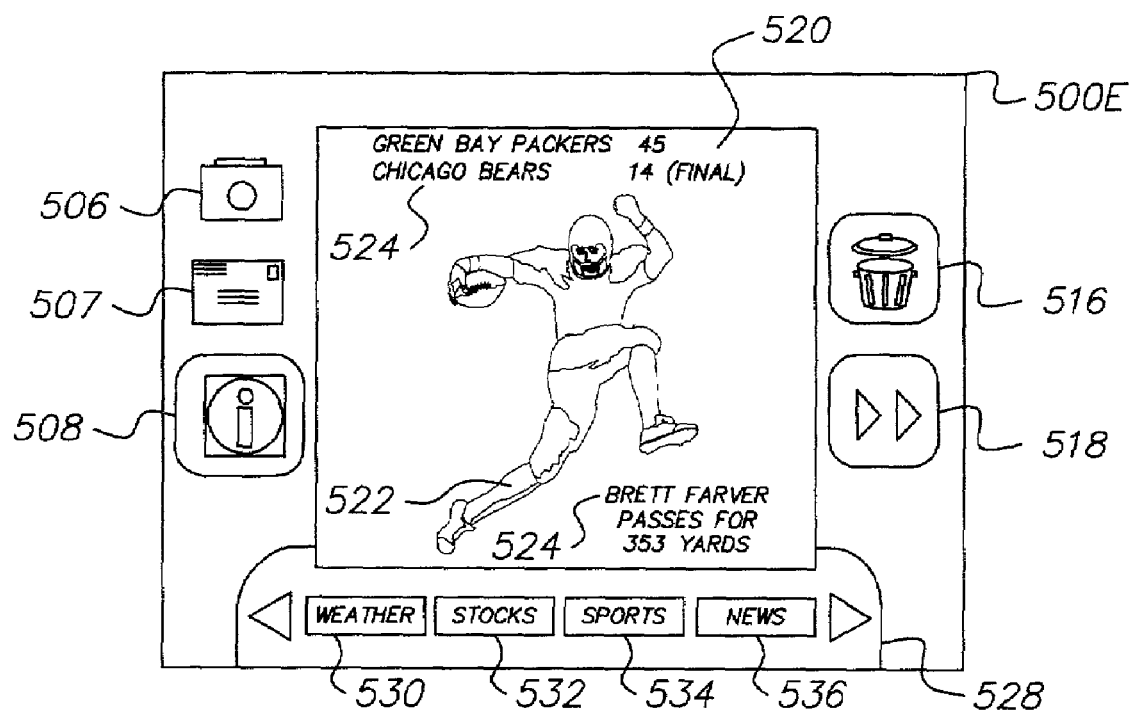
FIG. 8C depicts the user interface when the digital camera is displaying information downloaded from the service provider.

When the user selects icon 508 in FIG. 8B (or automatically when the digital camera 300 is placed in the docking unit 350, if this is the default mode selected by the user), the user interface screen displayed on color image display 332 is user interface screen 500E shown in FIG. 8C. In this mode, the digital camera 300 displays the content files transferred from the service provider, which have previously been stored in the CONTENT directory 450 shown in FIG. 6. Icon 508 is highlighted, indicating that it is the current display mode. The user can change modes by selecting icons 506 or 507.

In FIG. 8C, the camera user has the ability to review the content for the various categories selected by the user in block 104 of FIG. 2. Content display window 520 displays the information from the sports content file. This content may be text information only, or may include graphics, still digital images, or video images 522 as well as text messages 524. The text messages can include final scores, statistics, and the like. The user can select other content categories by selecting appropriate icons, such as the weather icon 530, stocks icon 532, sports icon 534, or news icon 536 shown in content category icon area 528, through use of the left and right arrow buttons 384 in FIG. 5B.

In addition, the user has the ability perform a number of actions by selecting appropriate icons. By selecting icon 516, the user can delete the content file currently displayed in content display window 520. By selecting icon 518, the user can initiate a slide show presentation of the content transferred from the content service provider 40. The content files are displayed, one at a time, on the color image display 332 of the digital camera 300. The display time for each file can use default values (e.g. 20 seconds per file).

In block 130, the digital camera 300 communicates with the content service provider 40 in order to download updated content, such as the latest stock reports, sports scores, etc. This can be done on a regular basis (e.g. twice per day) or on an as-needed basis, as the content changes, depending on the content update option selected by the customer, as described earlier in relation to line 10 of FIGS. 7A and 7B.

In block 132 the customer disconnects the camera from the docking unit. In this case, the customer can still use the color image display 332 to view the digital images and content that have been previously downloaded, while the camera batteries 346 power the camera. This provides a convenient way for the customer to view the downloaded content.

The customer can, of course, repeat blocks 110 to 112 to capture another group of digital images and transfer the images to the content service provider 40, which can then provide additional photo products and services as described in relation to blocks 114–118.

A computer program product, such as a readable storage medium, can store the programs in accordance with the present invention for operating the methods set forth above. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to certain preferred embodiments thereof, but it will be understood that variations and modifications can be effected within the spirit and scope of the invention.

PARTS LIST 10 home computer
12 CPU motherboard
14 display monitor
16 keyboard
18 mouse
20 hard drive
22 modem
24 card reader
30 Internet service provider
32 modems
34 computers/routers
36 channel
40 content service provider
42 Internet server
44 electronic database
46 billing system
48 bill issuing
50 fulfillment system
52 production controller
54 color printer
66 photo product
70 shipping system
72 shipping label printer
74 shipping label
76 CD writer
100 block
102 block
104 block
106 block

PARTS LIST (CON'T)

108 block
110 block
112 block
114 block
116 block
118 block
120 block
122 block
124 block
130 block
132 block
300 digital camera
302 flash
303 user controls
304 control processor and timing generator circuit
306 clock driver
308 autofocus and autoexposure detectors
310 zoom and focus motor drives
312 zoom lens
314 image sensor
316 analog signal processing and analog-to-digital converter circuit
318 DRAM buffer memory
320 processor
322 docking interface
324 memory card interface
326 RAM memory
328 firmware memory
330 flash memory card
332 image display

PARTS LIST (CON'T)

333 microphone
335 audio amp & A/D
337 D/A and audio amp
339 speaker
344 power supply
346 rechargeable batteries
350 docking unit
352 connector
354 connector pins
356 connector pins
358 connector pin
360 power converter
362 AC plug
370 modem
372 phone connector
374 phone cable
380 shutter button
382 up/down arrows
384 left/right arrows
386 select button
400 root directory
410 MISC directory
412 digital print order file
420 DCIM directory
430 subdirectory
432 file
434 file
436 file
438 file

PARTS LIST (CON'T)

440 subdirectory
442 file
444 file
446 file
450 CONTENT directory
452 file
454 file
456 file
458 file
460 file
500A user interface screen
500B user interface screen
500C user interface screen
500D user interface screen
500E user interface screen
502 image display window
504 information bar
504A information
504B information
506 icon
507 icon
508 icon
510 icon
512 icon
514 icon
516 delete icon
517 audio control icons
518 slide show icon
520 content display window

PARTS LIST (CON'T)

522 video images
524 text messages
528 content category icon area
530 weather icon
532 stocks icon
534 sports icon
536 news icon

What is claimed is:

1. A system including a plurality of digital cameras, and docking units, and a service provider, to permit the digital cameras to be coupled to the Internet, comprising:
   a) the digital camera including:
      i) a viewable display;
      ii) an image capture lens;
      iii) an image sensor for receiving a visual image provided by the capture lens to produce an image signal, a processor responsive to the image signal for producing a digital image so that the viewable display can respond to such image to provide a viewable image;
      iv) a docking interface to permit the digital camera to be connected to the docking unit; and
      v) a memory; and
   b) the docking unit including:
      i) a connector for providing an electrical connection with the docking interface in the digital camera; and
      ii) a network connection for interconnecting the docking unit to the channel; and
   c) the service provider including a memory for storing a plurality of user accounts, each identifying particular content categories previously selected by a particular user, and content information corresponding to the plurality of content categories, and for communicating content information to a plurality of digital cameras associated with the plurality of user accounts, whereby the content information, corresponding to content categories identified in the service account associated with each digital camera, is communicated over the Internet to the plurality of digital cameras; and
   d) the digital camera receiving the content information and displaying the content information on the viewable display, wherein the memory of the digital camera utilizes a directory structure comprising a plurality of directories including at least a captured image directory for storing captured images captured by the camera at a relatively high resolution, a transferred image directory for storing images transferred to the digital camera from the service provider at a relatively low resolution, and a content directory for storing the content information as files corresponding to the respective content categories.

2. The system of claim 1 wherein the service provider also communicates digital image files over the Internet to the digital camera, and the digital camera receives and displays the digital image files on the viewable display.

3. The system of claim 1 wherein the content categories include at least one sports team selected by a particular user.

4. The system of claim 1 wherein the content categories include at least one stock selected by a particular user.

5. The system of claim 1 wherein the content category includes at least one sports category, a news category and a financial category.

6. A method for providing communication over a channel between a service provider and a plurality of digital camera users, wherein a given digital camera has an associated docking unit, and the given digital camera includes:
  i) a viewable display;
  ii) an image capture lens;
  iii) an image sensor for receiving a visual image provided by the capture lens to produce an image signal, a processor responsive to the image signal for producing a digital image so that the viewable display can respond to such image to provide a viewable image;
  iv) a docking interface to permit the digital camera to be connected to the docking unit; and
  v) a memory; and the docking unit includes:
  i) a connector for providing an electrical connection with the docking interface in the digital camera; and
  ii) a network connection for interconnecting the docking unit to the channel; and
the method including providing a memory for the service provider for storing a plurality of user accounts, each identifying particular content categories previously selected by a particular user, and content information corresponding to the plurality of content categories;
communicating content information to the plurality of digital cameras associated with the plurality of user accounts, whereby the content information, corresponding to content categories identified in the service account associated with each digital camera, is communicated over the channel to the plurality of digital cameras; and
the plurality of digital cameras receiving the content information and displaying the content information on the viewable display, wherein the memory of the given digital camera utilizes a directory structure comprising a plurality of directories including at least a captured image directory for storing captured images captured by the camera at a relatively high resolution, a transferred image directory for storing images transferred to the digital camera from the service provider at a relatively low resolution, and a content directory for storing the content information as files corresponding to the respective content categories.

7. The method of claim 6 wherein the content categories include sports teams.

8. The method of claim 6 wherein the content categories include financial categories.

9. The method of claim 6 wherein the content categories include sports themes.

10. A system including a digital camera and a docking unit to permit the digital camera to be coupled to a channel for communication with a service provider, comprising:
  a) the digital camera including:
    i) a viewable display;
    ii) a lens for providing an optical image;
    iii) an image sensor for receiving the optical image provided by the lens to produce an image signal, a processor responsive to the image signal for producing a digital image so that the viewable display can respond to such image to provide a viewable image;
    iv) a memory for storing a plurality of digital images, the memory utilizing a directory structure comprising at least a captured image directory and a transferred image directory, the captured image directory being configured for storing a plurality of digital images captured by the digital camera, the transferred image directory being configured for storing a plurality of digital images transferred to the digital camera from the service provider, wherein the transferred digital images have a lower resolution than the captured digital images;
    v) a docking interface to permit the digital camera to be connected to the docking unit; and
    vi) a processor coupled to the memory for providing communication through the docking unit to a channel so that one or more of the captured digital images stored in the memory are transferred over the channel to the service provider and one or more of the transferred digital images are received over the channel from the service provider and stored in the memory, the processor further being coupled to the viewable display so that the captured digital images and the transferred digital images stored in the memory can be viewed on the viewable display; and
  b) the docking unit including:
    i) a connector for receiving the docking interface in the digital camera and for connecting the digital camera to the docking unit;
    ii) a power supply for providing power to the digital camera; and
    iii) a network connection for interconnecting the docking unit to the channel for transferring one or more of the captured digital images to the service provider and for receiving one or more of the transferred digital images from the service provider.

11. The system of claim 10 wherein the processor further receives content files via the channel and causes information from such content files to be stored in the memory and to be displayed on the viewable display, the content files corresponding to content categories previously selected.

12. The system of claim 10 wherein the channel is the Internet and when the digital camera is connected to the docking unit, the processor automatically causes the connection over the Internet to a predetermined service provider, and the predetermined service provider automatically provides the plurality of transferred images to the channel for transfer to the memory in the digital camera.

13. The system of claim 10 wherein the captured digital images are stored as JPEG files in a first subdirectory and the transferred digital images are stored as JPEG files in a second subdirectory.

14. The system of claim 10 wherein the processor reduces the size of the captured digital images prior to displaying them on the viewable display.

\* \* \* \* \*